Jan. 14, 1941.    D. O. JOHNSON ET AL    2,228,879
SEAL
Filed March 17, 1939
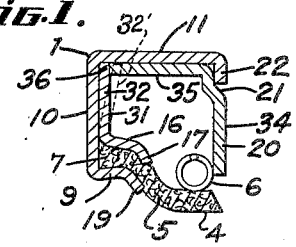
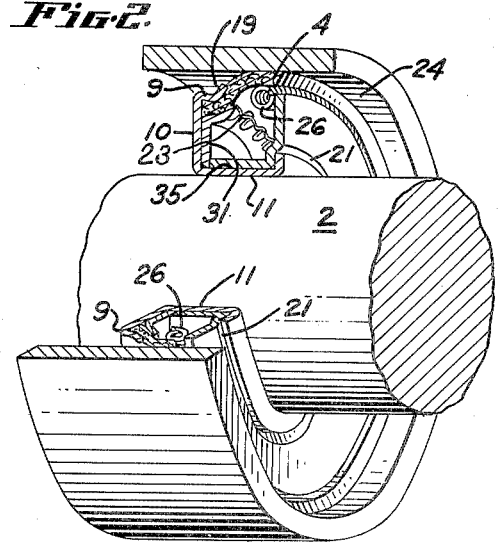
INVENTORS
DWIGHT O. JOHNSON
ANTONE FRED ANDERSON
BY
ATTORNEY Patented Jan. 14, 1941

2,228,879

UNITED STATES PATENT OFFICE 2,228,879

SEAL

Dwight O. Johnson and Antone Fred Anderson, Oakland, Calif.

Application March 17, 1939, Serial No. 262,360

4 Claims. (Cl. 288—3)

Our invention relates to seals and particularly to a unitary structure arranged to close off a space between a shaft and housing. This application is a continuation in part of our application Ser. No. 180,151, filed Dec. 16, 1937, and entitled "Fluid seal."

In the sealing art there are many different forms of seals having the cage and the sealing lip manufactured in a unitary structure around a shaft and in a housing. Certain disadvantages exist in some of these structures from the point of view of the seal maintenance and manufacture. The present invention is intended to give greater ease of assembly and to produce a structure which will maintain its sealing contacts over a long period of time. In this embodiment we so make the seal that the clamping action between the sealing washer and its cage is obtained by radial pressure between an axially flanged inner cage member and an axial flange formed on the outer cage member. The axial components of the compressive stresses applied to the inner cage member are entirely absorbed by the radial wall of the outer cage member, with which it is in direct contact.

The object of our invention is to provide a unitary seal structure which is more easily assembled; to provide a seal in which the washer may be placed in position and clamped without tearing or piercing the surface of the sealing member; to provide a seal in which the clamping member and the sealing washer can be assembled in the cage member in a single operation; to provide a cage in which the sealing member can be clamped between axially extending flanges on the outer and inner cage members after the inner and outer housing members have been completely formed before assembly; to provide a seal in which the clamping of the housing on the flexible member is tightened within the cage portion when finally assembled; to provide a cage in which the preformed axial clamping portions reform the edge of the sealing washer on assembly into a keystone shape; to provide a seal in which the flexible washer may be assembled within the inner and outer cage portions with the use of considerable pressure without tearing the washer; to provide a seal which does not permit rotation of the sealing member relative to its cage; to provide a seal having relatively few parts which may be assembled quickly and easily in an economical manner.

The invention possesses other objects and features of advantage, some of which, with the foregoing, will be set forth in the following description of a preferred form of our invention which is illustrated in the drawing accompanying and forming a part of the specification. It is to be understood that we do not limit ourselves to the showing made by the drawing and description as we may adapt a variation of the preferred form within the scope of our invention as set forth in the claims.

In the drawing:

Fig. 1 is a sectional view of one form of our invention arranged for "internal" sealing.

Fig. 2 is a perspective view, partially in section, of the embodiment of Fig. 1 arranged for "external" sealing.

Referring now to the drawing for a more complete exposition of our invention, it will be seen that our new form of seal is equally well adapted to both "inside" and "outside" sealing. By "inside" sealing is meant that type of construction in which the seal cage is force-fitted within a housing and the sealing lip projects centrally thereof into contact with a shaft which passes through the annular sealing member. By "outside sealing," we refer to that type of construction in which the cage member is force-fitted onto a shaft and in which the flexible sealing lip projects radially beyond the limits of the cage to contact a cylindrical housing surface which surrounds the entire seal.

In Fig. 1, a section of the seal 1 is shown having the sealing washer 5 and a garter spring 6. The washer 5 has in section the form of an elongated S. The edge of washer 5 opposite the sealing lip 4 acts as a clamping portion 7. Washer 5 is preferably pre-formed with the clamping edge 7 of substantially greater diameter than the sealing lip portion 4 in order that the clamping edge may be spaced away from the shaft sufficiently to encompass an inwardly extending axial flange 9 turned from the radial wall 10 of the outer housing. Radial wall 10 is in turn formed normally to a cylindrical wall 11 which is arranged for press fitting within a cylindrical housing, not shown in this figure. In assembly the clamping edge 7 of the sealing member 5 may be forced around axial flange 9 by pressure exerted axially of the housing during the insertion of the inner cage member 31 or it may be positioned on flange 9 before the member 31 is applied.

Inner cage member 31 has a radial wall 32 capable of being made to fit snugly against the radial wall 10 of the outer cage, engaging tightly at its peripheral portion 36 within the cylindrical peripheral wall 11, and formed integrally with axial flange 16. This radial wall 32 is preferably dished slightly so that upon assembly the outer portion, when first engaged by wall 35, is spaced away from wall 10 and is forced down against it as edge 22 is spun over. (See dotted lines 32' on Fig. 1.) Also this effects a tightening of the axial clamping joint around the sealing member. Cage closure member 34 has a cylindrical wall 35 fitting tightly within peripheral wall 11, and held firmly in contact with the peripheral portion 36 of radial wall 32 by flange 22, which is turned over recess 21.

In Fig. 2, we have shown the structure of Fig. 1 embodied in a form suited for "external" sealing with the sealing lip 4 pressed against a cylindrically surfaced housing 24 by an expanding spring 26, while the cylindrical wall 11 is press-fitted on the shaft 2.

Flange 16 (Fig. 1) preferably makes a small acute angle with the surface of the shaft being sealed and is of such diameter as to fit snugly about the clamping portion 7 of flexible washer 5. At the free edge of axial flange 16 we form an inturned clamping edge or rim 17. As shown in the drawing this is preferably a sharp edge so that it effects a very tight gripping of the flange 7. The axial flange portion 16 draws the flexible material of the clamping edge portion 7 into keystone shape, while the rim 17 applied an important additional clamping pressure to the washer against the ridge on axial flange 9 of the outer cage member. In other words, the rim 17 terminates axially beyond the ridge formed at the junction of flange 9 and skirt 19, and radially toward said ridge so it can function as an edge lock adjacent the open mouth of the clamping groove and break the sealing member over the ridge.

Skirt 19 also reinforces the outer cage against the great stresses produced therein by forcing the sealing member and the dished inner cage into position, as well as backing up the washer so it cannot be forced along the shaft through the gap.

After the inner cage member of the sealing washer has been forced around and clamped to the axial flange 9 of the outer cage member and the washer is in position, the garter spring 6 may be placed in position around the sealing lip 4, and an annular closure member 34 preferably having a peripheral recess 21 may be placed adjacent the inner cage member and positioned to hold the garter spring 6 in its proper position. In order to provide a more satisfactory keystoning of the clamping edge 7, we may find it desirable to turn the axial flange 9 slightly more than a right angle from the radial wall 10. We have found that when our seal is manufactured in its present form, the pressure of the axial flange portion 16 of the inner cage member tends to draw the material of the flexible sealing member 5 into full seated position, and to cause it to flow into the keystone portion without creating such stresses as will result in the tearing and the eventual breakdown of the washer material at the point of contact with the clamping edge 17.

Advantage is taken of the reinforcing skirt 19, which strengthens the outer cage during the stresses incident to assembly, and of the contour of the inner cage portions engaging the washer, which form a keystone shaped clamping jaw to draw the leather into position and cause it to "flow" into the clamping groove, while the rim 17 tightly clamps the sealing member.

In Fig. 2, we have shown the inner cage member with a fluted edge 23 on the axial clamping flange 16, which fluted edge we find desirable to insure that the sealing washer will not rotate in the clamping groove. This fluting prevents entirely any rotation of the washer about the shaft and has additional advantages in securing a tight grip on the leather.

In Fig. 2, we have illustrated the washer of Fig. 1 with all the parts reversed, in order that the sealing lip 4 may engage a cylindrical housing surface 24. The structural modifications include replacing the contractile garter spring 6 by an expansive garter spring 26, in order that the proper sealing contact may be maintained.

From the above description of our invention it will be seen that we have successfully produced a seal in which the flexible sealing member may be clamped between a flanged sharp edged portion on the outer cage member and inner cage member by radial pressure only. By using the structure shown we are able to assemble the flexible member with the cage parts with less danger of injuring the former and with a more secure hold thereon. We have shown means for preventing rotation of the washer about its axis, although seals made without the fluting may be used. We have referred to the use of leather as a sealing washer, but it is obvious that for the commonly known leather members we may substitute different materials or may use leathers treated in any suitable manner to increase their effectiveness. The form of spring shown to maintain the sealing lip in contact with the surface to be sealed is also susceptible of change, and we may use any equivalent means which produce the proper pressure between the sealed surface and the lip. Other variations in the form and proportions of the individual elements will occur to those skilled in the art. For example, the flutings which we have shown on the inner cage member may be formed in the flange 9 on the outer cage member. All such variations are deemed to fall within the skill of those familiar with seal construction, to be fully equivalent to the embodiments which we have described and illustrated, and to fall within the scope of the appended claims.

We claim:

1. A unitary fluid seal adapted for press fit insertion to seal the space between moving parts having cylindrical faces, comprising a cage member having a peripheral surface for press fit engagement with a cylindrical face, and having a radial portion, said radial portion having its edge adjacent the surface to be sealed bent to form an axial flange inclined slightly away from said surface; a flexible sealing member extending substantially co-axially of the cylindrical face being sealed and having one end adjacent the inside surface of said axial flange; a clamping washer having an axial clamping flange cooperating with the axial flange on said cage member to form a clamping groove for said sealing member, and having a radial wall portion which is dished in its unassembled form and when nested in said cage member is stressed to a substantially flat condition, and a case closure member also nesting within said cage and having an axially extending portion in contact with said clamping washer and a radially extending portion closing the open end of said cage.

2. A unitary fluid seal adapted for press fit insertion to seal the space between moving parts having cylindrical faces, comprising a cage member having a peripheral surface for press fit engagement with a cylindrical face, and having a radial portion, said radial portion having its edge adjacent the surface to be sealed bent to form an axial flange; a flexible sealing member extending substantially co-axially of the cylindrical face being sealed and having one end adjacent the inside surface of said axial flange; a clamping washer having an axial clamping flange cooperating with the axial flange on said cage member to form a clamping groove for said sealing member, and having a radial wall portion which is dished in its unassembled form and when nested in said cage member is stressed to a substantially flat condition, and a case closure member also nesting within said cage and having an axially extending portion in contact with said clamping washer and a radially extending portion closing the open end of said cage.

3. A unitary fluid seal adapted for press fit insertion to seal the space between moving parts having cylindrical faces, comprising a cage member having a peripheral surface for press fit engagement with a cylindrical face, and having a radial portion, said radial portion having its edge adjacent the surface to be sealed bent to form an axial flange and an angularly disposed depending skirt with a ridge separating one from the other; a flexible sealing member extending substantially co-axially of the cylindrical face being sealed and having one end adjacent the inside surface of said axial flange; a clamping washer having an axial clamping flange cooperating with the axial flange on said cage member to form a clamping groove for said sealing member, and having a radial wall portion which is dished in its unassembled form and when nested in said cage member is stressed to a substantially flat condition, and said axial flange having an extended rim portion which terminates axially beyond said ridge and is bent radially toward the mouth of said clamping groove where it bears on said sealing member, thereby forming an edge lock substantially in line with the mouth of said groove, a case closure member also nesting within said cage and having an axially extending portion in contact with said clamping washer and a radially extending portion closing the open end of said cage.

4. A unitary fluid seal adapted for press fit insertion to seal the space between moving parts having cylindrical faces, comprising a cage member having a peripheral surface for press fit engagement with a cylindrical face, and having a radial portion, said radial portion having its edge adjacent the surface to be sealed bent to form an axial flange; a flexible sealing member extending substantially co-axially of the cylindrical face being sealed and having one end adjacent the inside surface of said axial flange; a stressed clamping member having an axial clamping flange cooperating with the axial flange on said cage member to secure said sealing member in place and a radial wall in contact with the axial wall of said cage member, said stress being imparted during assembly by deforming the radial wall of said clamping member from a dished shape to a substantially flattened nested condition, a case closure member also nesting within said cage and having an axially extending portion in contact with said clamping washer and a radially extending portion closing the open end of said cage.

DWIGHT O. JOHNSON.
ANTONE FRED ANDERSON.